United States Patent [19]
Alessi

[11] 3,832,019
[45] Aug. 27, 1974

[54] DOVETAIL SLIDE

[76] Inventor: Vincent J. Alessi, 835 Seagull Ln., Newport Beach, Calif. 92660

[22] Filed: Apr. 7, 1972

[21] Appl. No.: 241,973

[52] U.S. Cl. ............................ 308/3 A, 308/6 R
[51] Int. Cl. ............................................ F16c 21/00
[58] Field of Search ........ 308/3 A, 3 R, 63, 64, 65, 308/6 R; 74/89.15; 287/1, 89.15

[56] References Cited
UNITED STATES PATENTS

| | | | |
|---|---|---|---|
| 1,285,628 | 11/1918 | Craley | 308/3 R |
| 2,340,450 | 2/1944 | Bauschor | 308/3 A |
| 2,780,501 | 2/1957 | Rosenberg | 308/3 R |
| 3,054,645 | 9/1962 | Evans | 308/3 A |
| 3,233,949 | 2/1966 | Rieman | 308/3 A |
| 3,363,083 | 1/1968 | O'Conner | 308/6 R |

FOREIGN PATENTS OR APPLICATIONS

| | | | |
|---|---|---|---|
| 325,439 | 9/1920 | Germany | 308/4 A |

Primary Examiner—Manuel A. Antonakas
Assistant Examiner—R. H. Lazarus

[57] ABSTRACT

A dovetail or ball bearing slide comprised of a tenon and mating mortise, said tenon being divided into two ears by a slot. One of the ears is rendered flexible by thinning the material on one side of the slot near the root of the slot. A screw threaded through one ear of the tenon and bearing against the other ear adjusts the tenon size to exactly fit the mortise and thus allows a slide to be made with no play and any desired stiffness of fit.

8 Claims, 7 Drawing Figures

3,832,019

DOVETAIL SLIDE

BACKGROUND OF THE INVENTION

1. Field of the Invention

This invention relates to dovetail and ball bearing slides and more particularly to an improved mechanism for adjusting the fit of such slides.

2. Prior Art

The present invention provides an inexpensive precision slide capable of fine adjustment for fit so that a smooth playless motion can be had even though the parts have been made with loose machining tolerances.

Prior art dovetails have utilized a separate gib for compensating for machining tolerances. These gibs tighten directly against the side of the tenon without any spring action and are thus difficult to adjust to obtain a smooth light fit without play. The difficulties with prior art dovetail slides are particularly evident when miniature slides are desired as where a slide is being used to adjust probes used in semiconductor testing. Prior art devices require tiny parts and fine screws which are difficult and expensive to make. The dovetail slide of the present invention does not require a separate gib but instead involves an adjustment of the size of the tenon itself to fit the mortise exactly. The adjustment is accomplished in the preferred embodiment by slotting the member carrying the tenon between the ears of the tenon, rendering one of the resulting tenon supports relatively flexible and providing screw means for forcing the ears of the tenon apart so that it can be adjusted to exactly fit the mortise.

Accordingly, it is a primary object of the present invention to provide an economically producible precision dovetail or ball bearing slide capable of fine adjustment.

SUMMARY OF THE INVENTION

The present invention relates to dovetail and ball bearing slides and is particularly useful for miniature slides used in assemblies which require extremely fine setting resolutions. Typical setting resolution of slides made in accordance with the present invention is of the order of 1 micron. This fine resolution is obtained by providing an adjustment for fit which is capable of precise adjustment so as to result in smooth motion without play.

The tenon portion of the slide is rendered expandable by creating a slot between the ears of the tenon and introducing some flexibility in the structure on which the tenon is cut so that a screw threaded into the structure of one ear of the tenon and bearing against the structure of the other ear can be used to adjust the fit of the tenon into the mortise.

Slide motion is achieved by utilizing a captive screw with a knurled head disposed between the ears of the tenon and engaging a nut carried by the mortise member.

Three such slides assembled with their axes forming an orthogonal coordinate system can be used to position test probes or other attachments precisely in space with respect to the structure upon which the assembly is mounted.

The novel features which are believed to be characteristic of the invention, both as to its organization and method of operation, together with further objects and advantages thereof will be better understood from the following description considered in connection with the accompanying drawings in which a presently preferred embodiment of the invention is illustrated by way of example. It is to be expressly understood, however, that the drawings are for the purpose of illustration and description only and are not intended as a definition of the limits of the invention.

BRIEF DESCRIPTION OF THE INVENTION

Figure 2:
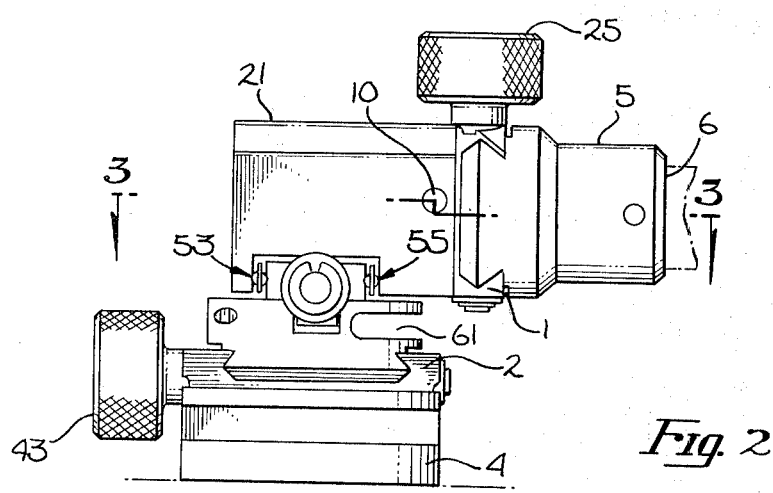
FIG. 2 is an enlarged side view of one of the test probe micropositioners of FIG. 1.

Referring now to FIG. 2 which shows the invention as applied to a three motion test probe micropositioner useful for testing of semiconductor integrated circuits. The micropositioner of FIG. 2 contains three orthogonal slides providing independent linear motions in each direction of a three component coordinate system. The three directions may be designated X, Y, and Z. The numeral "2" refers generally to the dovetail slide associated with the X motion, numeral "3" to the Y motion, and numeral "1" to the Z motion. Each of the dovetail slides 1, 2, and 3 are constructed in accordance with a different preferred embodiment of the present invention. It will be appreciated that all three slides making up the probe micropositioner illustrated could be made in accordance with any one of the embodiments and the arrangement shown was selected for purposes of ease of explanation only.

Figure 1:
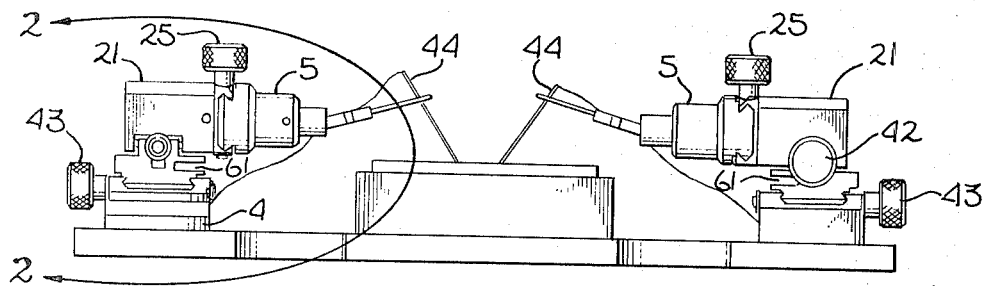
FIG. 1 is a side view of two test probe micropositioners each having three orthogonal slides in accordance with presently preferred embodiments of the invention and disposed to position test probes on a semiconductor device.
Figure 3:
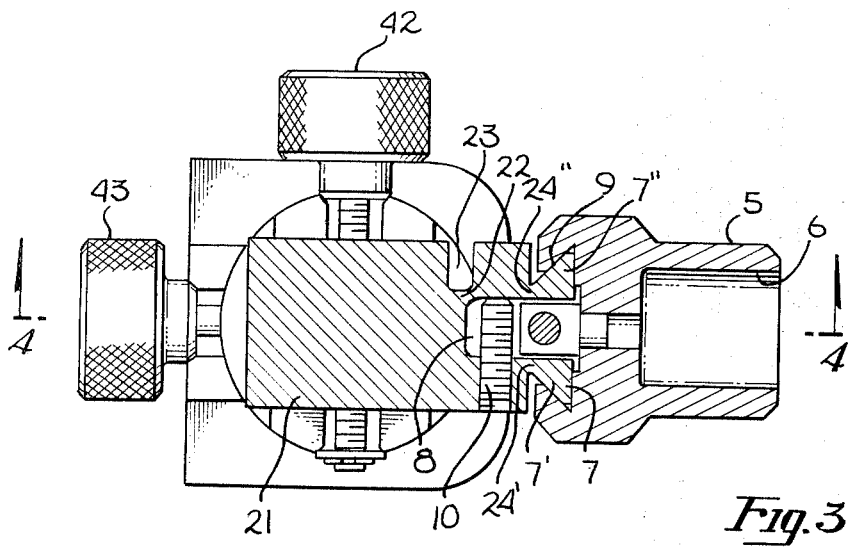
FIG. 3 is a vertical cross-sectional view of the micropositioner of FIG. 2 taken on plane 3—3.

The base 4 can be fastened to a table or other stationary surface and the head 5 contains a bore 6 for accepting probes or other attachment devices such as probes 44 which may be seen in FIG. 1. Adjustments 25, 42 and 43 cause motion along the axes and thus allow the probe 44 to be set to any desired position. The dovetail slide 1 may be best seen in cross section in FIG. 3 and includes a body 21 having a tenon portion 7 which is divided into two ears 7' and 7" by slot 8. Tenon 7 is intended to mate with but is machined slightly smaller than mortise 9 in head 5. The machining of tenon portions 7' and 7" and slot 8 leaves narrow webs 24' and 24" giving some degree of flexibility between tenon portions 7' and 7" and body 21. Screw 10 is threaded through body 21 on one side of slot 8 and bears against body 9 on the other side of slot 8. Slot 23 is cut into body 21 so as to leave a narrow web of material 22 between adjacent portions of slots 8 and 23.

Mortise 9 is machined slightly larger than the undeformed size of tenon 7. Tightening screw 10 against body 21 causes web 22 to flex and separates tenon portions 7' and 7". When tenon 7 is expanded to be exactly the size of mortise 9, head 5 will slide smoothly up and down over tenon 7 without play. Further tightening of screw 10 will cause tenon ears 7' and 7" to bear more tightly against the inside of mortise 9 with webs 24' and 24" flexing slightly. Screw 10 can be adjusted to secure any degree of tightness in the sliding motion desired.

Figure 4:
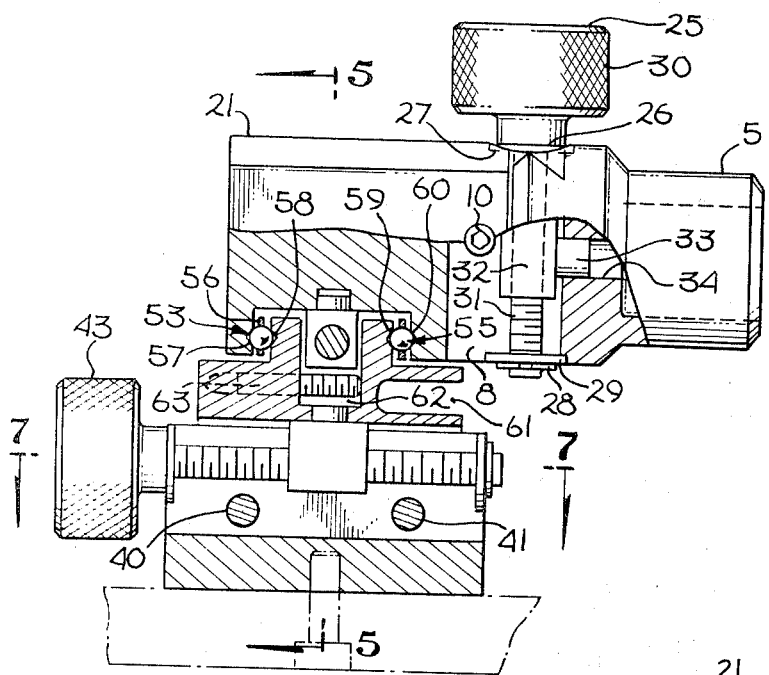
FIG. 4 is partly broken side view of the micropositioner of FIG. 2. The broken section is taken on plane 4—4 of FIG. 3.

The adjusting means for dovetail slide 1 can best be seen in FIG. 4 where the adjusting screw 25 is shown with a shoulder 26 resting against the surface of spotface 27 on the top of body 21. Adjusting screw 25 is retained in body 21 by means of a snap ring 28 installed in a groove near the end of screw 25 and resting against the surface of spotface in the bottom of body 21. Spotface 27 and spotface 29 are located at each end of and are centered on slot 8. Screw 25 has a large diameter knurled portion 30 for finger adjustment and a threaded portion 31 extending through slot 8.

Nut 32 which engages screw 25 carries a cylindrical boss 33 extending at right angles from the threaded portion of the nut. Boss 33 is a slip fit into bore 34 in head 5. Thus when adjusting screw 25 is turned, nut 32 is translated either up or down thereby moving head 5 along the dovetail. Screw 25 is preferably finely threaded so that small adjustments in the position of head 5 can be made. Approximately 100 threads per inch has been found to be convenient for purposes of positioning probes for semiconductor testing.

Positioning resolution better than 1 micron can be achieved routinely using the present invention.

Figure 5:
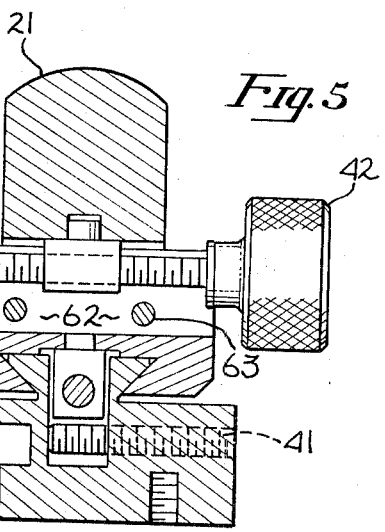
FIG. 5 is a horizontal section taken on plane 5—5 of FIG. 4.
Figure 7:
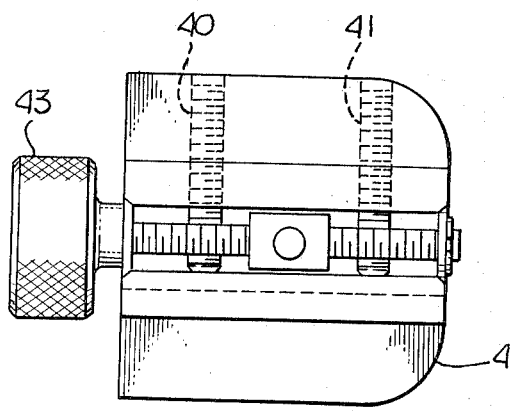
FIG. 7 is a disassembled vertical view of base 4.

A second embodiment of this invention is illustrated by the X axis dovetail slide 2. This embodiment can best be seen in FIGS. 4, 5, and 7. The difference between slide 2 and slide 1, previously described, is that slide 2 utilizes two tightening screws 40 and 41 instead of the single tightening screw 10 of the first embodiment.

Two or more tightening screws allow longer slides to be adjusted under conditions where the length of the slide makes adjustment by means of a single adjustment screw impractical.

A third preferred embodiment of the present invention, dovetail slide 3, can best be seen in cross section in FIG. 4 which shows a version which includes a slide which utilizes ball bearings rather than the sliding contacts of dovetail slides 1 and 2.

Figure 6:
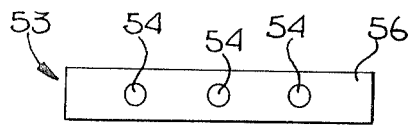
FIG. 6 is the ball assembly of the Y axis ball bearing slide.

The mating mortise and tenon are shown with their mating faces all parallel rather than at an angle to each other as in embodiments 1 and 2. The tenon is retained in the mortise by the interlocking effect of grooves 57, 58, 59, and 60 with ball assemblies 53 and 55. The ball assemblies 53 and 55 are identical and as can be seen in FIG. 6 each includes a plurality of balls 54 and a retainer 56. The grooves 57, 58, 59, and 60 can have either a "V" form or an arcuate form whichever is convenient.

Slots 61 and 62 and screw 63 correspond to slots 23 and 8 and screw 10 of embodiment 1, previously described. The adjustment of this embodiment is the same as previously described.

What has been described is a novel dovetail slide. Various modifications will be apparent to those skilled in the art and are considered to be within the spirit of this invention as set forth in the appended claims.

I claim:

1. A dovetail slide comprising:
   a. a body having a tenon on one surface thereof;
   b. a slot in said body, the axis of said slot being substantially parallel to the axis of said tenon and positioned between the ears of said tenon, the configuration of said body being such that a portion of said slot approaches a surface of said body defining a web portion of said body whereby one of said ears is rendered flexible with respect to said body;
   c. means for adjustable displacing said flexible ear with respect to said body, said means including a screw extending between said body and said flexible ear whereby tightening said screw will cause said flexible ear to deflect with respect to said body, the other of said ears not being deflected with respect to said body; and
   d. a head having a mortise therein, said mortise being adapted to mate with said tenon.

2. A dovetail slide comprising:
   a. a body having a tenon along one surface thereof;
   b. a first slot in said body, the axis of said slot being substantially parallel to the axis of said tenon and positioned between the ears of said tenon;
   c. a second slot in said body, said second slot being formed at right angles to said first slot, the axis of said second slot being parallel to the axis of said first slot, and the root of said second slot being adjacent to one side of said first slot at the root of said first slot defining a web portion of said body whereby one of said ear's ears is rendered flexible with respect to said body;
   d. means for displacing said flexible ear with respect to said body, said means including one or more screws extending between said body and said flexible ear whereby tightening said screw will cause said flexible ear to deflect with respect to said body, the other of said ears not being deflected with respect to said body; and
   e. a head having a mortise therein, said mortise being adapted to mate with said tenon.

3. A dovetail slide comprising:
   a. a body having a tenon on one surface thereof;
   b. a slot in said body, the axis of said slot being substantially parallel to the axis of said tenon and positioned between the ears of said tenon, the configuration of said body being such that a portion of said slot approaches a surface of said body defining a web portion of said body whereby one of said ears is rendered flexible with respect to said body;
   c. said means for displacing said flexible ear comprising:
      i. a tapped hole in said body, said tapped hole extending at right angles to the axis of said slot from the surface of said body opposite said web protion of said body through one side of said slot, the axis of said tapped hole being between said web portion and said tenon;
      ii. a screw threaded through said tapped hole and extending across said slot and bearing against the opposite side of said slot; and
   d. a head having a mortise therein, said mortise being adapted to mate with said tenon.

4. A dovetail slide as recited in claim 3, wherein said means for forcing said ears of said tenon apart comprises a plurality of said tapped holes and a plurality of said screws.

5. A dovetail slide as recited in claim 3, and further including means for displacing said mortise along said tenon.

6. A dovetail slide as recited in claim 5, wherein said means for displacing said mortise comprises:
   a. a nut affixed to said head, said nut being disposed within said slot;
   b. a screw disposed within said slot engaged with said nut; and,
   c. means for restraining said screw from axial motion relative to said tenon.

7.
   a. first, second, third and fourth members;
   b. dovetail slide micropositioning device having first, second and third dovetail slides, said first dovetail slide being between said first and second members, said second dovetail slide being between said second and third members, and said third dovetail slide being between said third and fourth members, the axes of said three dovetail slides being orthogonal;
   c. each of said slides including a body having a tenon on one surface thereof;
   d. each of said bodies being provided with a slot, the axis of said slot being substantially parallel to the axis of said tenon and positioned between the ears of said tenon, the configuration of said body being such that a portion of said slot approaches a surface of said body defining a web portion of said body whereby one of said ears is rendered flexible with respect to said body;
   e. means for adjustable displacing said flexible ear with respect to said body, said means including a screw extending between said body and said flexible ear whereby tightening said screw will cause said flexible ear to deflect with respect to said body, the other of said ears not being deflected with respect to said body; and
   f. a head having a mortise therein, said mortise being adapted to mate with said tenon.

8. A positioning device comprising:
   a. first, second, third, and fourth members;
      i. said first member is a base having a flat mounting surface parallel to said first and second dovetail slides;
      ii. said fourth member is adapted to receive attachment devices;
   b. first, second and third dovetail slides, said first dovetail slide being between said first and second members, said second dovetail slide being between said second and third members, and said third dovetail slide being between said third and fourth members, the axes of said three dovetail slides being orthogonal; and
   c. said dovetail slides including:
      i. a body having a tenon on one surface thereof;
      ii. a slot in said body, the axis of said slot being substantially parallel to the axis of said tenon and positioned between the ears of said tenon, the configuration of said body being such that a portion of said slot approaches a surface of said body defining a web portion of said body whereby one of said ears is rendered flexible with respect to said body;
      iii. means for adjustable displacing said flexible ear with respect to said body, said means including a screw extending between said body and said flexible ear whereby tightening said screw will cause said flexible ear to deflect with respect to said body, the other of said ears not being deflected with respect to said body; and
      iv. a head having a mortise therein, said mortise being adapted to mate with said tenon.

* * * * *